United States Patent
Bajar et al.

(10) Patent No.: US 7,769,175 B2
(45) Date of Patent: *Aug. 3, 2010

(54) SYSTEM AND METHOD FOR INITIATION OF A SECURITY UPDATE

(75) Inventors: David Bajar, Kitchener (CA); Simon T. Wise, Waterloo (CA); Ian M. Patterson, Petersburg (CA)

(73) Assignee: Research In Motion Limited, Waterloo (CA)

( * ) Notice: Subject to any disclaimer, the term of this patent is extended or adjusted under 35 U.S.C. 154(b) by 885 days.

This patent is subject to a terminal disclaimer.

(21) Appl. No.: 11/303,296

(22) Filed: Dec. 16, 2005

(65) Prior Publication Data

US 2006/0248342 A1 Nov. 2, 2006

Related U.S. Application Data

(63) Continuation-in-part of application No. 10/996,702, filed on Nov. 24, 2004.

(60) Provisional application No. 60/734,383, filed on Nov. 8, 2005.

(51) Int. Cl.
H04K 1/00 (2006.01)
G06F 21/00 (2006.01)

(52) U.S. Cl. .................................. 380/270; 713/182
(58) Field of Classification Search ............... 380/270; 713/182
See application file for complete search history.

(56) References Cited

U.S. PATENT DOCUMENTS 5,668,876 A * 9/1997 Falk et al. .................. 380/271
2002/0035591 A1 * 3/2002 Kimura ...................... 709/200
2002/0035699 A1 * 3/2002 Crosbie ...................... 713/201
2002/0169966 A1 * 11/2002 Nyman et al. ............... 713/182
2004/0097217 A1 * 5/2004 McClain ..................... 455/411
2004/0123137 A1 * 6/2004 Yodaiken .................... 713/200
2006/0256968 A1 * 11/2006 Lemasson ................... 380/270
2007/0274524 A1 * 11/2007 Ksontini et al. ............. 380/270
2008/0040608 A1 * 2/2008 Li et al. ...................... 713/182

OTHER PUBLICATIONS

Handbook of Applied Cryptography, Chapter 10 by A. Menezes, P. van Oorschot, and S. Vanstone, CRC Press, 1996 pp. 385-424.*
IP in Wireless Networks Excerpt : Section 15.3. Publisher: Prentice Hall Pub Date: Jan. 31, 2003.*
Canadian Office Action; Application 2,527,767; Canadian Intellectual Property Office; Jul. 27, 2009; 3 pages.

(Continued)

Primary Examiner—Kambiz Zand
Assistant Examiner—Benjamin A Kaplan
(74) Attorney, Agent, or Firm—The Danamraj Law Group, P.C.

(57) ABSTRACT

In one embodiment, a scheme is provided for securing a personalized indicium assigned to a mobile communications device. Upon detecting at a mobile communications device that one of a list of criteria have been met, a challenge-and-response procedure is initiated by the mobile communications device. During the challenge-and-response procedure, the mobile communications device and a network node will authenticate the personalized indicium using a shared authentication key.

19 Claims, 7 Drawing Sheets

OTHER PUBLICATIONS

EPO Search Report in EP Application No. 04257296.6; European Patent Office; Jun. 9, 2005; 4 pages.
"TIPHON Release 4; Service Independent requirements definition; Threat Analysis"; ETSI; Technical Report; Apr. 2001; 49 pages.
EPO Search Report in EP Application No. 07109669.7; European Patent Office; Nov. 7, 2007; 6 pages.
Menezes et al.; "Handbook of Applied Cryptography"; Chapter 10; Identity and Entity Authentication; CRC Press, Inc.; 1996, 41 pages.
EPO Examination Report in EP Application No. 07109669.7; European Patent Office; Feb. 13, 2009; 3 pages.
"Mobility and Security Management"; The GSM System; 74 pages, published Jun. 1992.

* cited by examiner

SYSTEM AND METHOD FOR INITIATION OF A SECURITY UPDATE

PRIORITY AND CROSS-REFERENCE TO RELATED APPLICATION(S)

This nonprovisional application claims priority based upon the following prior United States provisional patent application entitled: "SYSTEM AND METHOD FOR AUTOMATIC INITIATION OF A SECURITY UPDATE" filed Nov. 8, 2005, Application No. 60/734,383 (RIM No. 30543-US-PRV) in the name(s) of: David Bajar, Simon Wise and Ian Patterson, which is hereby incorporated by reference. This nonprovisional application is also a Continuation-in-Part of U.S. patent application Ser. No. 10/996,702 filed Nov. 24, 2004. The subject matter disclosed herein is related to the subject matter disclosed in the following commonly owned pending applications: (i) "SYSTEM AND METHOD FOR SECURING A PERSONALIZED INDICIUM ASSIGNED TO A MOBILE COMMUNICATIONS DEVICE," filed Nov. 24, 2004, application Ser. No. 10/996,702 (RIM No. 21127-US-PAT) in the name(s) of: David Bajar, Herb A. Little, James Godfrey, Allan David Lewis, Wen Gao, Marc Plumb, Michael Brown, Graeme Whittington and Neil Adams; (ii) "SYSTEM AND METHOD FOR PORTING A PERSONALIZED INDICIUM ASSIGNED TO A MOBILE COMMUNICATIONS DEVICE," filed Nov. 24, 2004, application Ser. No. 10/99,555 (RIM No. 21126-US-PAT), in the name(s) of: Graeme Whittington, Allan David Lewis, James Godfrey, Herb A. Little, and Marc Plumb; (iii) "SYSTEM AND METHOD FOR ASSIGNING A PERSONALIZED INDICIUM TO A MOBILE COMMUNICATIONS DEVICE," filed Nov. 24, 2004, application Ser. No. 10/997,577 (RIM No. 21125-US-PAT), in the name(s) of: Graeme Whittington, Allan David Lewis, James Godfrey, Christopher Smith, Arun Munje, Thomas Leonard Trevor Plestid, David Clark, Michal Rybak, Robbie John Maurice, and Marc Plumb; and (iv) "SYSTEM AND METHOD FOR MANAGING SECURE REGISTRATION OF A MOBILE COMMUNICATIONS DEVICE," filed Nov. 24, 2004, application Ser. No. 10/996,925 (RIM No. 21128-US-PAT), in the name(s) of: David Bajar, Allan David-Lewis, Wen Gao, Herb A. Little, James Godfrey, Marc Plumb, Michael Brown, and Neil Adams; all of which are incorporated by reference herein.

FIELD OF THE APPLICATION

The present invention generally relates to wireless packet data service networks. More particularly, and not by way of any limitation, the present invention is directed to a system and method for initiation of a security update.

BACKGROUND

It is becoming commonplace to use wireless packet data service networks for effectuating data sessions with mobile communications devices. In some implementations, unique indicia such as Personal Information Numbers or PINs are assigned to the devices in order to facilitate certain aspects of service provisioning, e.g., security, validation and service authentication, et cetera. In such scenarios, it becomes imperative that no two devices have the same indicium (i.e., collision). Further, such PIN indicia are mapped to individual Internet Protocol (IP) addresses used in packet-switched networks so that a mobile communications device continues to send and receive messages even if its IP address is changed for some reason. For example, wireless carriers may dynamically assign an IP address to a data-enabled mobile device, and if that device is out of coverage, the previously assigned IP address is reclaimed and recycled for another device requesting service.

Because mobile devices are becoming more feature rich, there is an increasing need for security. As applications become more and more complex, dealing with more and more valuable and confidential information, security must become more and more reliable. The security of mobile devices depends on having a reliable device PIN to IP mapping at the packet-switched network. Sometimes the packet-switched network becomes disjoint in its device PIN to IP mappings and it is not always possible for the packet-switched network to notice this problem.

BRIEF DESCRIPTION OF THE DRAWINGS

A more complete understanding of the embodiments of the present patent application may be had by reference to the following Detailed Description when taken in conjunction with the accompanying drawings wherein.

DETAILED DESCRIPTION OF THE DRAWINGS

Figure 1:
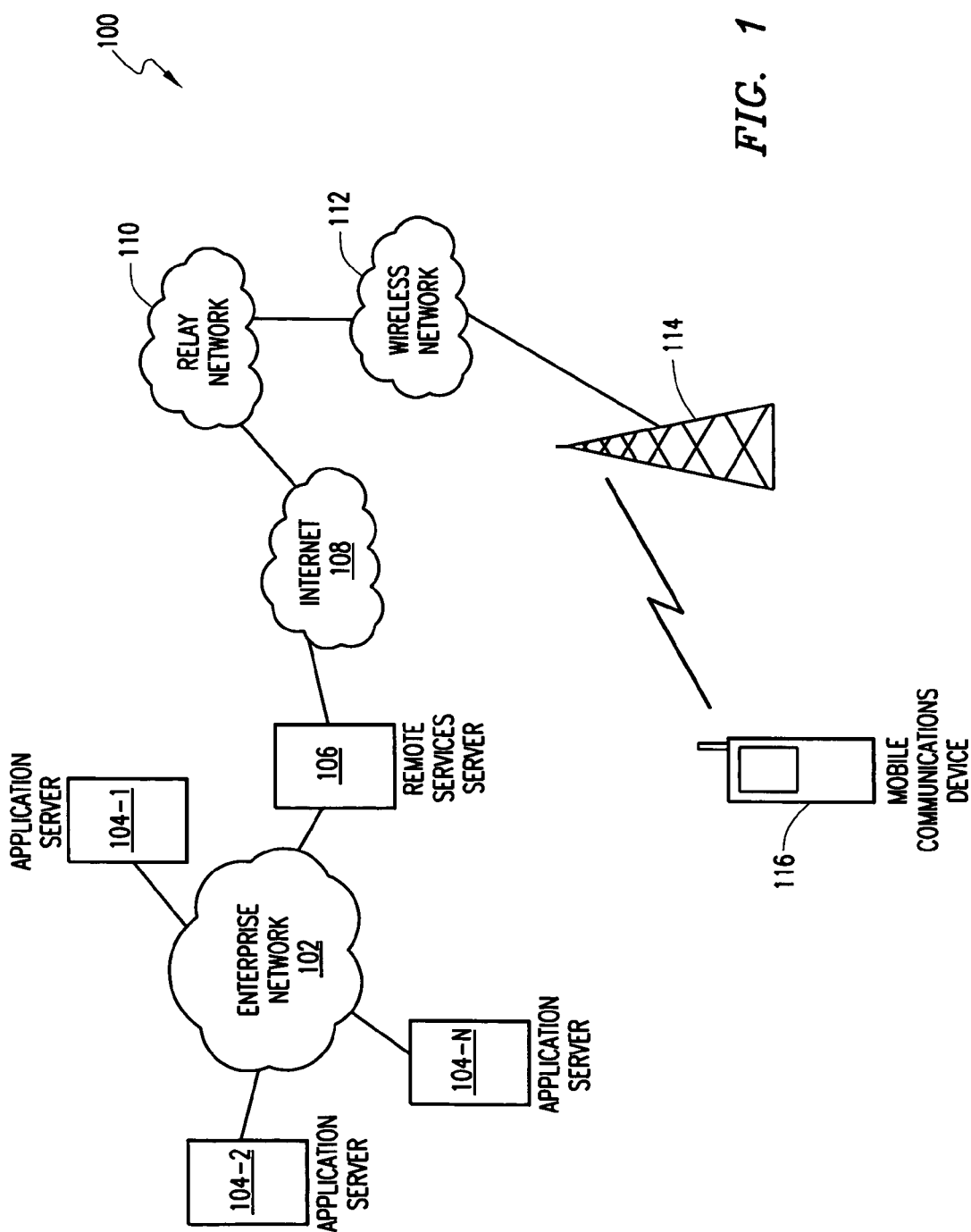
FIG. 1 depicts an exemplary network environment including a wireless packet data service network wherein an embodiment of the present patent application may be practiced.

A system and method of the present invention will now be described with reference to various examples of how the embodiments can best be made and used. Like reference numerals are used throughout the description and several views of the drawings to indicate like or corresponding parts, wherein the various elements are not necessarily drawn to scale.

Herein is described an embodiment wherein a mobile communications device can initiate a security update for a variety of reasons. By providing a mobile device the ability to initiate a security update, it becomes possible to ensure the highest likelihood of mobile device PIN to IP mapping at a packet switched network.

In one embodiment, a mobile communications device is disclosed, comprising: logic means operable to generate an authentication key for transmitting in a registration request to a network node operable with a wireless network, said authentication key for securing a personalized indicium assigned to said mobile communications device, wherein said personalized indicium comprises a Personal Information Number (PIN) that is mapped to at least one identifier associated with said mobile communications device; logic means operable to execute a challenge response when challenged by a challenge message from said network node, said challenge response including an authentication value of a challenge string transmitted in said challenge message, wherein said authentication value is created using said authentication key; and logic means for generating a challenge request for transmitting to said network node upon detection of one of the mobile communications device requiring a key, the mobile communications device acquiring a new communication channel, the mobile communications device receiving a message whose decoding reveals a descrambling error, before transmitting a message the mobile communications device discovering that it doesn't have a scrambling key, the mobile communications device receiving a descrambling error, the mobile communications device receiving an improperly versioned packet, the mobile communications device receiving a packet of which it is not the intended recipient, and the expiry of a timer or a user initiated event.

Another embodiment is directed to a method for securing a personalized indicium assigned to a mobile communications device, comprising: detecting at a network node that said mobile communications device has issued a challenge-response protocol sequence with said network node, wherein said mobile communications device's personalized indicium comprises a Personal Information Number (PIN) that is mapped to at least one identifier associated with said mobile communications device, wherein said challenge-response protocol sequence is issued by said mobile communication device based upon one of the mobile communications device requiring a key, the mobile communications device acquiring a new communication channel, the mobile communications device receiving a message whose decoding reveals a descrambling error, before transmitting a message the mobile communications device discovering that it doesn't have a scrambling key, the mobile communications device receiving a descrambling error, the mobile communications device receiving an improperly versioned packet, the mobile communications device receiving a packet of which it is not the intended recipient, and the expiry of a timer or a user initiated event; responsive to said detecting, issuing a challenge message to said mobile communications device by said network node, wherein a challenge response is operable to be generated by said mobile communications device using an authentication key; and based on said challenge response from said mobile communications device, determining at said network node whether said PIN is legitimately bound to said mobile communications device.

Yet another embodiment is directed to a method for securing a personalized indicium assigned to a mobile communications device, comprising: receiving at a network node a challenge request message from said mobile communications device, wherein said mobile communications device's personalized indicium comprises a Personal Information Number (PIN) that is mapped to at least one identifier associated with said mobile communications device and wherein said mobile communications device generates said challenge request message upon detection of one of the mobile communications device requiring a key, the mobile communications device acquiring a new communication channel, the mobile communications device receiving a message whose decoding reveals a descrambling error, before transmitting a message the mobile communications device discovering that it doesn't have a scrambling key, the mobile communications device receiving a descrambling error, the mobile communications device receiving an improperly versioned packet, the mobile communications device receiving a packet of which it is not the intended recipient, and the expiry of a timer or a user initiated event; responsive to said receiving, issuing a challenge message to said mobile communications device by said network node, wherein a challenge response is operable to be generated by said mobile communications device using an authentication key; and based on said challenge response from said mobile communications device, determining at said network node whether said PIN is legitimately bound to said mobile communications device.

In yet another embodiment, a network system is disclosed for securing a personalized indicium assigned to a mobile communications device, comprising: means for receiving at a network node a challenge request message from said mobile communications device, wherein said mobile communications device's personalized indicium comprises a Personal Information Number (PIN) that is mapped to at least one identifier associated with said mobile communications device and wherein said mobile communications device generates said challenge request message upon detection of one of the mobile communications device requiring a key, the mobile communications device acquiring a new communication channel, the mobile communications device receiving a message whose decoding reveals a descrambling error, before transmitting a message the mobile communications device discovering that it doesn't have a scrambling key, the mobile communications device receiving a descrambling error, the mobile communications device receiving an improperly versioned packet, the mobile communications device receiving a packet of which it is not the intended recipient, and the expiry of a timer or a user initiated event; means, operable responsive to said receiving, for issuing a challenge message to said mobile communications device, wherein a challenge response is operable to be generated by said mobile communications device using an authentication key; and means, operable responsive to said challenge response from said mobile communications device, for determining at said network node whether said PIN is legitimately bound to said mobile communications device.

Referring now to the drawings, and more particularly to FIG. 1, depicted therein is an exemplary network environment 100 including a wireless packet data service network 112 wherein an embodiment of the present patent application may be practiced. An enterprise network 102, which may be a packet-switched network, can include one or more geographic sites and be organized as a local area network (LAN), wide area network (WAN) or metropolitan area network (MAN), et cetera, for serving a plurality of corporate users. A number of application servers 104-1 through 104-N disposed as part of the enterprise network 102 are operable to provide or effectuate a host of internal and external services such as email, video mail, Internet access, corporate data access, messaging, calendaring and scheduling, information management, and the like. Accordingly, a diverse array of personal information appliances such as desktop computers, laptop computers, palmtop computers, et cetera, although not specifically shown in FIG. 1, may be operably networked to one or more of the application servers 104-i, i=1, 2, . . . , N, with respect to the services supported in the enterprise network 102.

Additionally, a remote services server 106 may be interfaced with the enterprise network 102 for enabling a corporate user to access or effectuate any of the services from a remote location using a suitable mobile communications device (MCD) 116. A secure communication link with end-to-end encryption may be established that is mediated through an external IP network, i.e., a public packet-switched network such as the Internet 108, as well as the wireless packet data service network 112 operable with MCD 116 via suitable wireless network infrastructure that includes a base station (BS) 114. In one embodiment, a trusted relay network 110 may be disposed between the Internet 108 and the infrastructure of wireless packet data service network 112. In another embodiment, the infrastructure of the trusted relay network 110 may be integrated with the wireless packet data service network 112, whereby the functionality of the relay infrastructure, certain aspects of which will be described in greater detail below, is consolidated as a separate layer within a "one-network" environment. Additionally, by way of example, MCD 116 may be a data-enabled mobile handheld device capable of receiving and sending messages, web browsing, interfacing with corporate application servers, et cetera, regardless of the relationship between the networks 110 and 112. Accordingly, a "network node" may include both relay functionality and wireless network infrastructure functionality in some exemplary implementations.

For purposes of the present patent application, the wireless packet data service network 112 may be implemented in any known or heretofore unknown mobile communications technologies and network protocols, as long as a packet-switched data service is available therein for transmitting packetized information. For instance, the wireless packet data service network 112 may be comprised of a General Packet Radio Service (GPRS) network that provides a packet radio access for mobile devices using the cellular infrastructure of a Global System for Mobile Communications (GSM)-based carrier network. In other implementations, the wireless packet data service network 112 may comprise an Enhanced Data Rates for GSM Evolution (EDGE) network, an Integrated Digital Enhanced Network (IDEN), a Code Division Multiple Access (CDMA) network, a Universal Mobile Telecommunications System (UMTS) network, or any $3^{rd}$ Generation (3G) network. As will be seen hereinbelow, the embodiments of the present patent application for securing a personalized indicium such as a PIN with respect to MCD 116 will be described regardless of any particular wireless network implementation.

Figure 2:
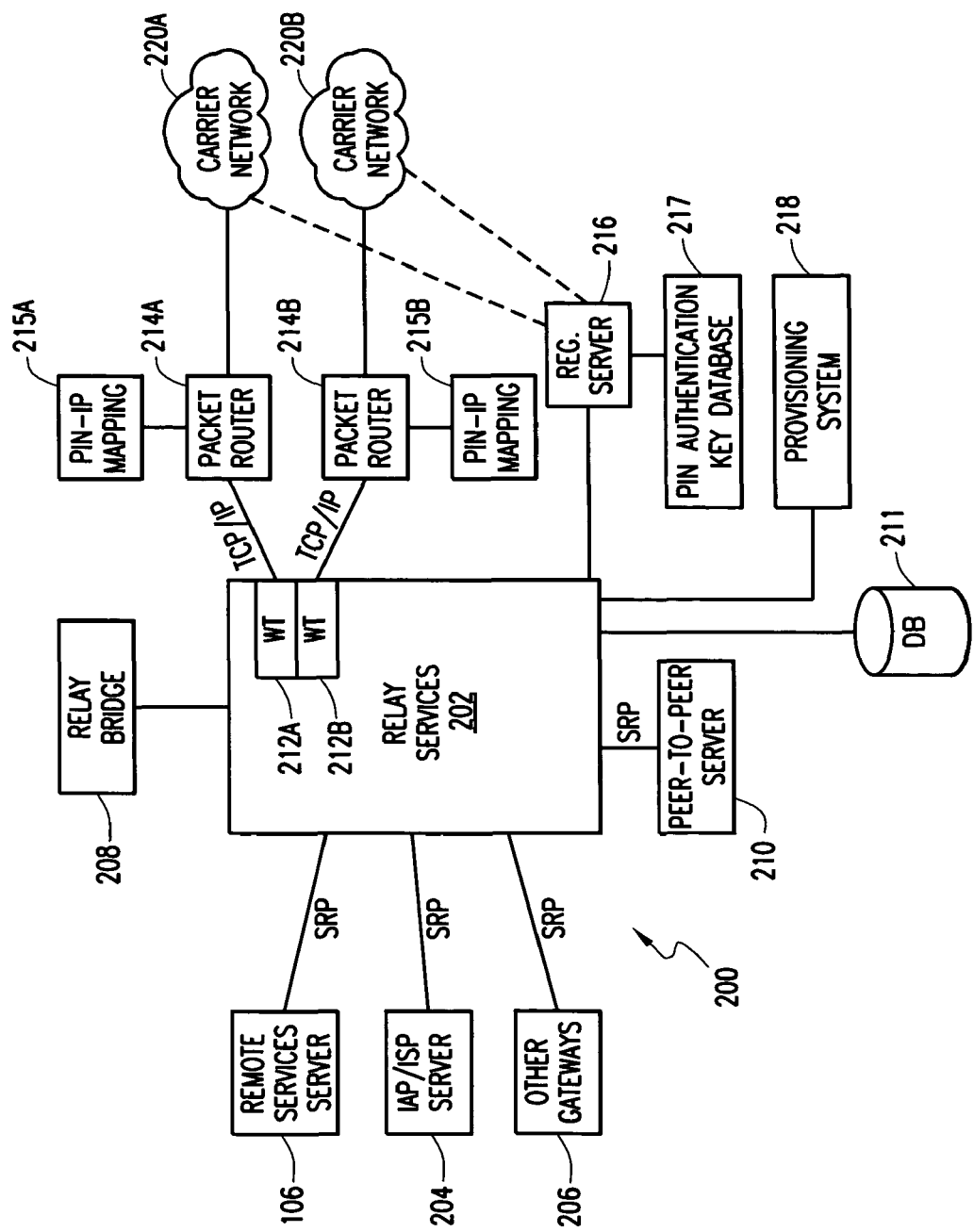
FIG. 2 depicts additional details of an exemplary relay network operable with a mobile communications device in accordance with an embodiment.

FIG. 2 depicts additional details of an exemplary relay network infrastructure 200 operable as part of relay network 110 interfacing with the wireless packet data service network 112 described above. A relay services node 202 is operable, at least in part, for providing connectivity between MCDs and various data application services (enterprise services, external IP data services, et cetera), regardless of the geographic location of the MCDs and their respective wireless carriers. Also, since multiple relay services nodes can co-exist in a distributed network architecture, a relay bridge 208 may be provided in operable connection with the relay services node 202 for supporting inter-relay connectivity. In one implementation, relay bridge 208 connects with separate relay node sites, forming tunnels between relays over which MCD messages can flow to and from services, irrespective of the region where the MCD is in.

Communication between the relay services node 202 and various application gateways and servers is effectuated using any suitable protocol, e.g., Server Relay Protocol (SRP), preferably over IP links. By way of illustration, remote services server 106 associated with the enterprise network 102 (shown in FIG. 1) communicates with the relay using SRP for effectuating internal data services with respect to the enterprise's mobile subscribers. Likewise, reference numerals 204 and 206 refer to external application gateways, such as Internet Service Provider (ISP) or Internet Access Provider (IAP) servers, and other gateways, respectively, which are also interfaced with the relay node 202 using SRP. A peer-to-peer server 210 may also be provided in operable connection with the relay node 202 for handling peer-level messaging between two MCDs using their respective PIN indicia.

Additionally, a database 211 may be provided in operable connection with the relay node 202 for handling and managing MCD location information. Preferably, this location information is stored by PIN indicia of the MCDs, which may be programmed into the devices at the time of manufacture or dynamically assigned afterwards, wherein the records maintain a particular device's last known location. A registration server 216 is operable for providing registration services for MCDs when they are initially activated or when the user re-registers due to moving to a different wireless network coverage area. In one implementation, the location information of registration server 216 may be programmed into an MCD. When the MCD registers successfully, registration server 216 is operable to provide the serving relay node's location, whereupon data sessions may be engaged by the MCD. Further, a database 217 is associated with the registration server 216 for storing a PIN authentication key provided by the MCD during its registration with the network. As will be seen in greater detail below, the PIN authentication key may be used by the network logic in securing the PIN indicium of an MCD so that it can be ensured that packets are delivered to or received from a legitimate MCD (i.e., with a valid PIN) instead of a device that has illegally accessed or stolen a PIN or managed to spoof a PIN.

One or more wireless transport (WT) interfaces are provided as part of relay services node 202 for connecting with wireless carrier networks that service MCDs. By way of illustration, WT 212A and WT 212B communicate with respective packet routers 214A and 214B using TCP/IP links, which route data packets to and from respective wireless packet data service networks, exemplified in FIG. 2 as carrier network 220A and carrier network 220B. To facilitate accurate routing, packet routers 214A, 214B are provided with PIN-IP mapping tables 215A and 215B that are used to route packets over IP networks. When a WT addresses a packet by PIN, the corresponding packet router interrogates the mapping table to look up and retrieve the current IP address for the MCD. In one implementation, the packet routers are operable to update the IP address of the MCD in the mapping tables every time they receive a packet. In another implementation, the IP-PIN mapping tables may be updated as necessary, e.g., when the IP address of an MCD is changed because it is dynamically assigned and may be reclaimed after the MCD has roamed out of a serving area.

In accordance with one embodiment, service logic provided with the WT modules is operable to initiate a challenge-response procedure with an MCD that has changed its IP address for some reason. Alternatively, the service logic is responsive to a challenge-response handshake request from an MCD on its own. The MCD has many reasons for which it may wish to initiate the challenge-response handshake. These reasons include, but are not limited to, the MCD requiring a scrambling key, the MCD noticing that its IP address has changed, a new tunnel or communication channel has become available, the receipt of a message whose decoding reveals a descrambling error, before transmission of a message discovering that the mobile communications device does not have a scrambling key, the MCD receiving an improperly versioned packet, the device receives a packet not intended for it signifying a PIN-to-IP error at the WT or the expiry of a timer or any other event such as user interaction. Each of the preceding reasons may create a possibility for the PIN to IP mapping at the WT to become incorrect. In each of these cases, the MCD will want to force a new mapping at the WT to ensure that security is maintained. To initiate a challenge, the MCD sends a Challenge Request packet to the WT. Appended to this Challenge Request (in the same packet), the MCD will also include a Challenge of its own to the WT. The MCD will restart the entire challenge-response sequence if it does not receive a result from its challenge request within a certain, stepped-back, retry timeframe (first at 10 seconds, then 120 seconds, then at 240 seconds for example). The WT responds to the MCD's Challenge Request with a Challenge packet. Also, the WT can send the MCD a Challenge without being prompted by a Request for any reason it may desire, including a change in properties of any application server or an address change. The Challenge Response packet built by the MCD contains a field to serve as the scrambling key used to scramble packet headers. It is a 20-byte string of data formed by hashing the contents of the Challenge packet received from the WT with the MCD's key established during the registration process. The Challenge Response packet can also contain the capability fields. Once the MCD creates the Challenge Response and receives a successful result, it must store the response and use it as the scrambling key for all subsequent transactions. In the Challenge Response packet, the MCD will also include a new challenge to the WT. Currently this challenge gets sent in both the MCD's initial Challenge Request, and this Challenge Response. It is possible that for optimization, one (but not both) of these challenges could be removed. In response to a successfully received Challenge Response, the WT sends out a Result packet. Appended to this Challenge packet, the WT will include a Challenge Response to the MCD's Challenge. To form the hashed key data in the Response, the WT hashes the random data sent by the MCD in the last Challenge Request it received with the MCD's key established during the registration process. Alternately, the challenge-response sequence is comprised of the WT generating a challenge message when an IP address change is detected by the packet router, or when it is requested by the MCD. In order for the packet router to communicate its IP-PIN mapping interrogation results to the WT logic, a message packet is transmitted in a suitable form that includes the information necessary for triggering the challenge generation service. In one exemplary implementation, the format of the message packet may be as follows:

<Packet-Type> <Version> <Length> <Device PIN> <Device IP> <IP Change/Update flag> <Data> where the Device PIN and Device IP fields may be populated by the values supplied by the MCD and not necessarily based on the IP-PIN mapping table. If the IP address for a particular PIN differs from the value in the mapping table, the IP Change/Update flag will be set accordingly, indicating that the WT logic is required to start a challenge-response handshake in order to validate the PIN and, if successful, update the IP mapping subsequently.

Continuing to refer to FIG. 2, registration server 216, which handles administration and registration services for MCDs, may also be provided with separate WT and packet routing for interfacing with the carrier networks 220A, 220B, although not specifically shown. A provisioning system (PRV) 218 may be co-located or otherwise associated with the relay services node 202 for setting up and managing various service providers (i.e., carrier networks), subscribers, MCD manufacturers, resellers, and other entities in order to support any number of service and market differentiation requirements. Additionally, the provisioning system 218 may include logic for provisioning personalized indicia (e.g., PIN assignment and management) with respect to the MCDs. Also, subscriber validation logic may be provided as part of the provisioning system 208.

One skilled in the art should appreciate that the various databases and service logic processing set forth above with respect to the relay network may be realized in suitable hardware, firmware and/or firmware logic blocks or in combination thereof. Furthermore, as alluded to before, the functionality of the relay network may also be integrated within a wireless carrier network, whereby a "network node" may generally comprise the relay layer functionality as well.

Figure 3:
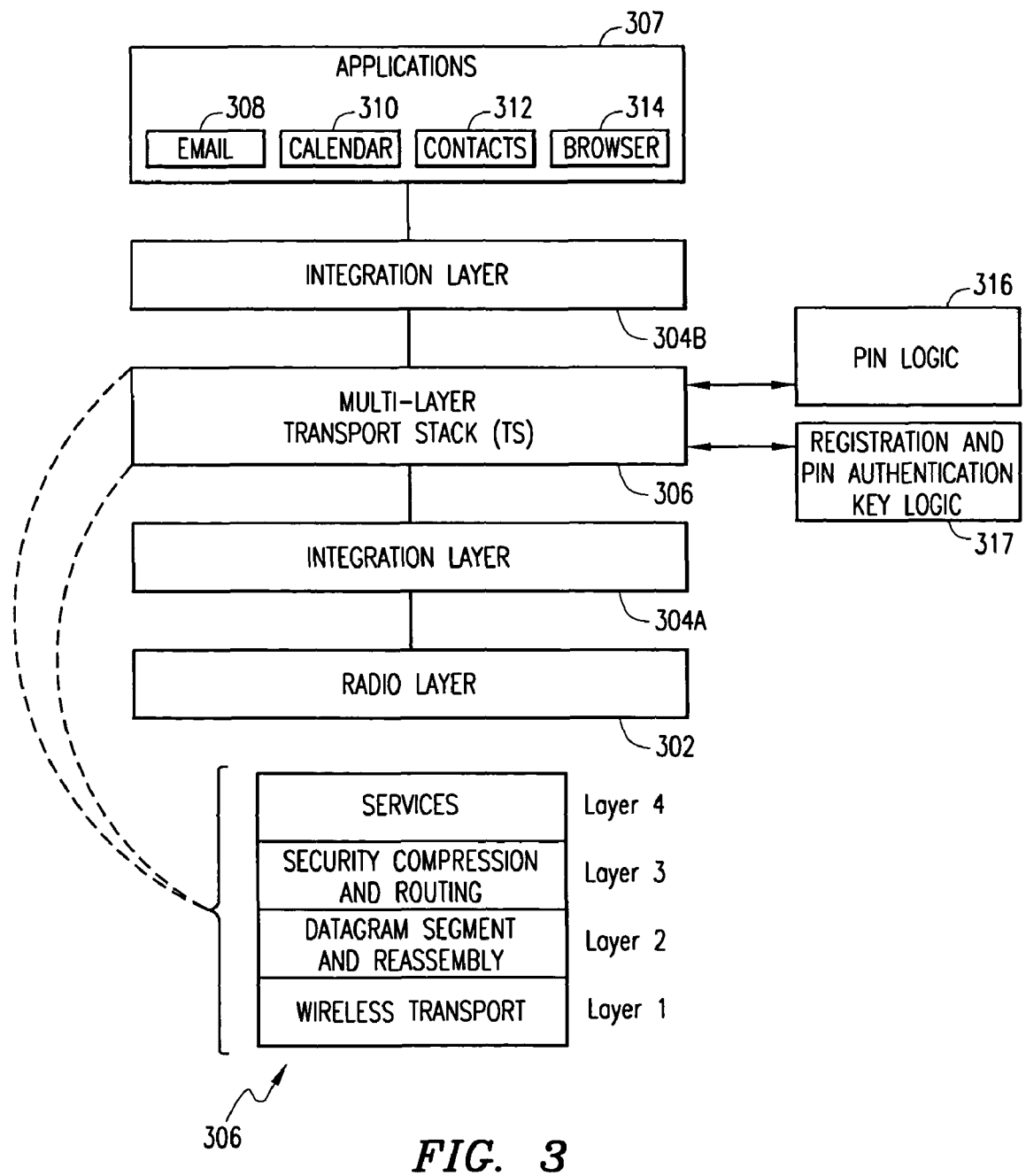
FIG. 3 depicts a software architectural view of a mobile communications device according to one embodiment.

FIG. 3 depicts a software architectural view of a mobile communications device operable according to one embodiment. A multi-layer transport stack (TS) 306 is operable to provide a generic data transport protocol for any type of corporate data, including email, via a reliable, secure and seamless continuous connection to a wireless packet data service network. As illustrated in the embodiment of FIG. 3, an integration layer 304A is operable as an interface between the MCD's radio layer 302 and the transport stack 306. Likewise, another integration layer 304B is provided for interfacing between the transport stack 306 and the user applications 307 supported on the MCD, e.g., email 308, calendar/scheduler 310, contact management 312 and browser 314. Although not specifically shown, the transport stack 306 may also be interfaced with the MCD's operating system. In another implementation, the transport stack 306 may be provided as part of a data communications client module operable as a host-independent virtual machine on a mobile device.

The bottom layer (Layer 1) of the transport stack 306 is operable as an interface to the wireless network's packet layer. Layer 1 handles basic service coordination within the exemplary network environment 100 shown in FIG. 1. For example, when an MCD roams from one carrier network to another, Layer 1 verifies that the packets are relayed to the appropriate wireless network and that any packets that are pending from the previous network are rerouted to the current network. The top layer (Layer 4) exposes various application interfaces to the services supported on the MCD. The remaining two layers, Layer 2 and Layer 3, are responsible for datagram segmentation/reassembly and security, compression and routing, respectively.

A PIN logic module 316 provided as part of the MCD's software environment is disposed in operable communication with the transport stack 306 as well as the OS environment. In one embodiment, the PIN logic module 316 comprises logic operable to request a PIN indicium from the provisioning network in a dynamic assignment. Alternatively, the PIN logic may include storage means for storing a PIN that is encoded during manufacture. Regardless of the PIN assignment mechanism, once a PIN is persistently associated with an MCD, it is bound to the MCD's at least one of a device identifier and a subscriber identifier (collectively, "identifier") such as, e.g., International Mobile station Equipment Identity (IMEI) parameters, International Mobile Subscriber Identity (IMSI) parameters, Electronic Serial Number (ESN) parameters, Mobile Identification Number (MIN) parameters, et cetera, that are hard-coded into MCDs depending on the wireless network technologies and protocols.

Continuing to refer to FIG. 3, a registration and PIN authentication logic module 317 provided as part of the MCD's software environment is disposed in operable communication with the transport stack 306 as well as the OS environment for effectuating registration procedures and PIN authentication services (e.g., generation of a PIN authentication key for transmission via a registration request to the network, generation of an authentication value, e.g., a digital signature, in a challenge response, et cetera).

Figure 4:
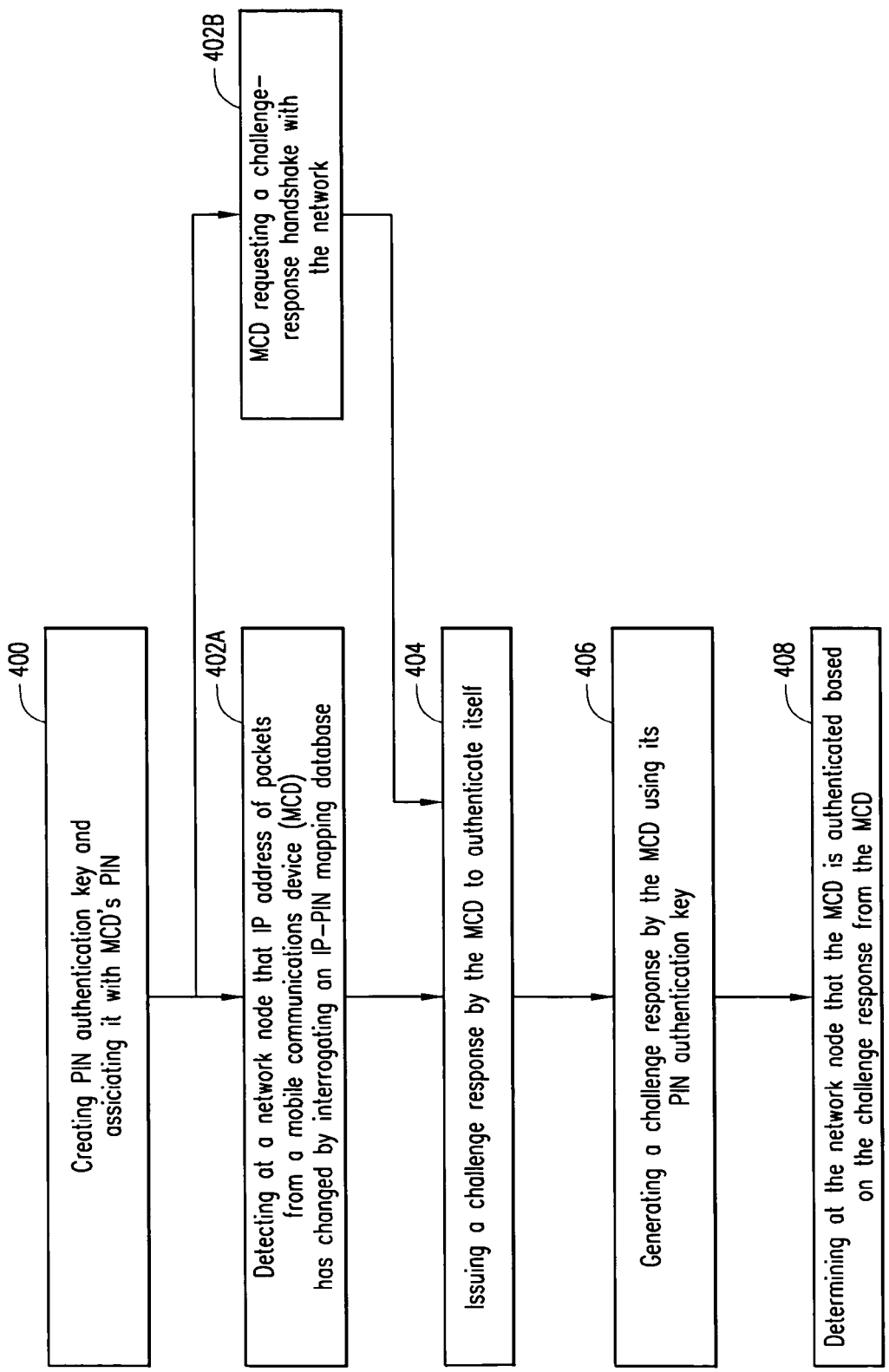
FIG. 4 depicts a flowchart of an embodiment for securing a PIN indicium assigned to a mobile communications device.

FIG. 4 depicts a flowchart of an embodiment for securing a PIN indicium assigned to an MCD. Once the MCD is identified with a PIN, it is operable to generate a PIN authentication key for communication to the relay network as part of a registration request's payload. Upon receiving the key, the registration server stores it in the database to which a WT module has access, and will permanently associate it with the PIN (block 400). Subsequent registration requests may therefore have to specify the same PIN authentication key on each request or they will be rejected, although a "downgrade" provision can allow a subscriber to clear the key within a time window from the time it is first created.

Two situations are possible where the service logic of the relay network may be required to ensure the authenticity of an MCD's PIN. When the MCD's IP address is changed for some reason, the packets transmitted to the relay network node have a new IP address as the source address, which is detected by interrogating an IP-PIN mapping database (block 402A). As described previously, the packet routers of the network node may be engaged in the detection process. Alternatively, the MCD may request on its own a challenge-response handshake (i.e., a challenge-response protocol sequence) with the relay network because, e.g., its dynamic IP address may have changed (block 402B). The network logic is then operable to issue a challenge to the MCD to authenticate itself (block 404). A challenge response is then generated by the MCD using its PIN authentication key (block 406), which is transmitted to the network. Based on the challenge response from the MCD, the network service logic is operable to determine whether the MCD is authenticated, i.e., the PIN is legitimately bound to the MCD (block 408).

Figure 5:
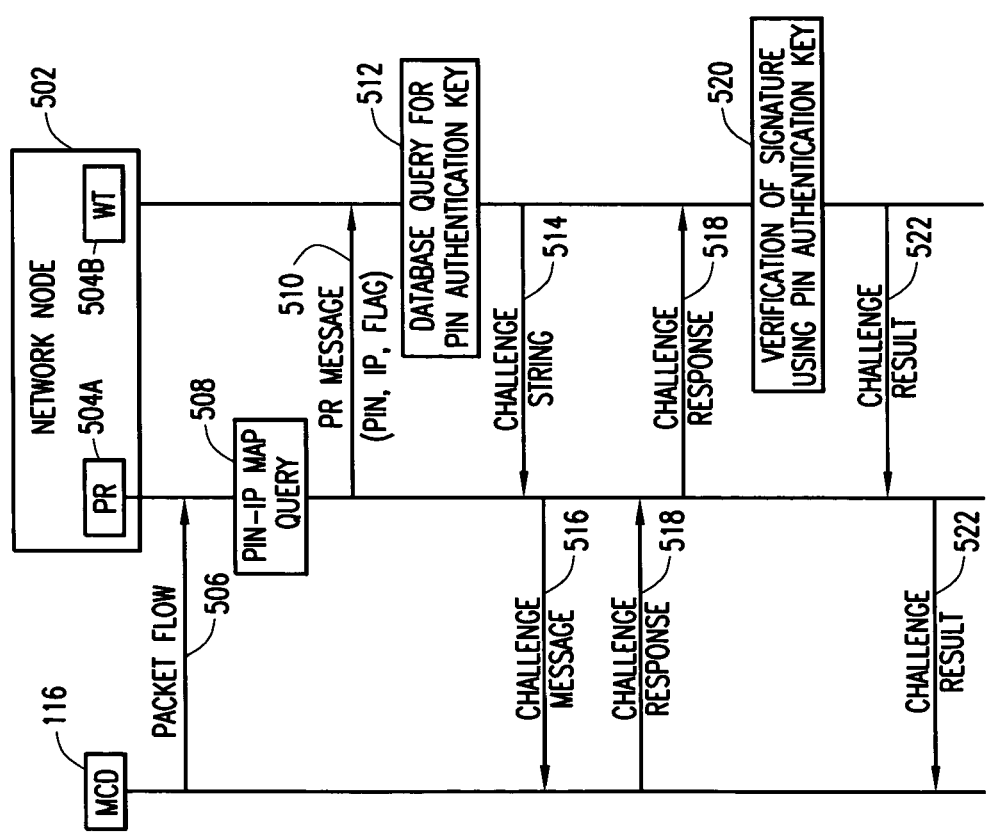
FIG. 5 depicts a message flow diagram with respect to an exemplary secure PIN mechanism according to one embodiment.

FIG. 5 depicts a message flow diagram with respect to an exemplary secure PIN mechanism according to one implementation. A network node 502 including packet router (PR) functionality 504A and WT functionality 504B is provided to be illustrative of the infrastructure of a generalized network, which can be a wireless network, a relay network, or a combination of both, wherein the secure PIN functionality described above is realized. Reference numeral 506 refers to packets with a source IP address that is different from the IP address known to the network service logic as being assigned to MCD 116. Alternatively, reference numeral 506 may refer to a challenge request packet flow from MCD 116 in accordance with a Control Message Protocol (CMP). A database query 508 of a PIN-IP mapping table is performed at PR 504A, which determines that the source IP address corresponding to the PIN has changed. A packet router message 510 is then provided to WT 504B, which includes the new IP address, MCD's PIN and a flag indicative of the condition that the source IP has changed. In response thereto, WT 504B effectuates a database query 512 to obtain an authentication key that corresponds to the MCD's PIN, whereupon a challenge string (e.g., including a random number and the device's new IP address) 514 is generated. An encrypted challenge message 516 containing the challenge string is then transmitted from PR 504A to MCD 116, which generates a challenge response 518 using its shared PIN/IP authentication key for digitally signing the response packet. In one embodiment, MCD 116 is operable to use any known hashing algorithm on the challenge string to generate a hash value that is provided as part of the challenge response 518. Upon receiving the challenge response from MCD 116, PR 504A forwards it to WT 504B wherein the service logic is operable to compare the received response with an expected response in order to verify the authentication value (block 520). A challenge result 522 is then propagated back to MCD 116 from the network node 502, the result being indicative of whether the verification process 520 was a success (i.e., a positive acknowledgment that the device/PIN combination is authentic and packet flow may commence) or a failure (i.e., a negative acknowledgment which may result in locking out the device).

Figure 6:
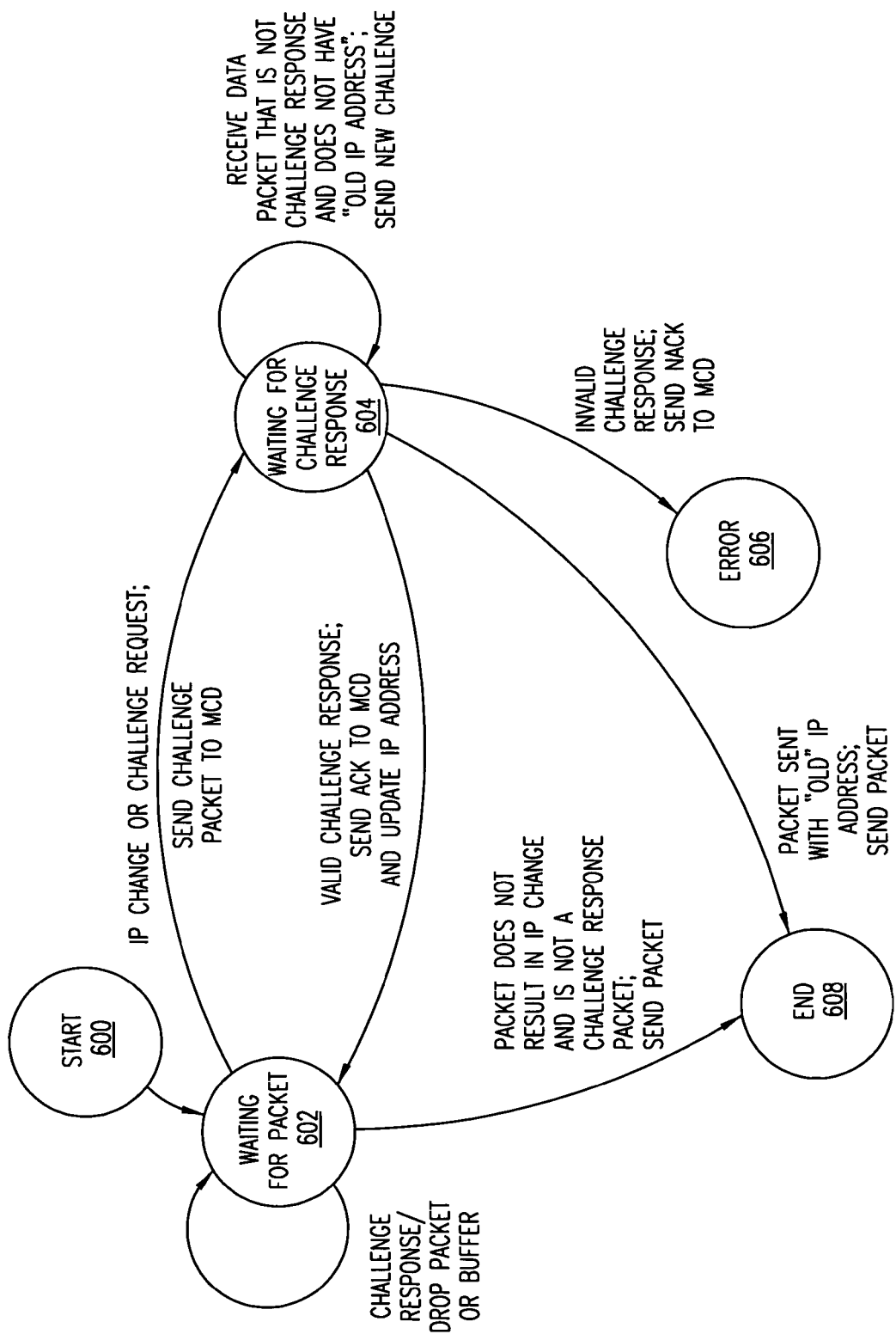
FIG. 6 depicts a state diagram according to one embodiment for securing a mobile communications device's PIN indicium.

A state diagram relating to the challenge-response procedure embodiment set forth hereinabove is shown in FIG. 6. From a Start state 600, the logic transitions to a Waiting for Packet state 602 operable to process packet flow from an MCD. When a packet with a changed IP address or a challenge request arrives, the logic transitions to a Waiting for Challenge Response state 604 and a challenge packet is transmitted to the MCD. In one implementation, while the logic waits for the response, the packets from the MCD may be dropped unless a buffering scheme is provided. Upon receiving a valid challenge response, an acknowledgment is provided to the MCD and the IP address thereof is suitably updated, whereupon the logic transitions back to Waiting for Packet state 602. If an incoming packet does not result in IP address change and is not a challenge response packet, the packet is forwarded to the network infrastructure for subsequent processing and routing. In that case, the service logic simply transitions to an End state 608. If an invalid challenge response is provided by the MCD, a negative acknowledgment (i.e., error) is transmitted to the MCD, and the service logic subsequently transitions to an Error state 606.

Those skilled in the art should appreciate that given the possibility of lost packets and attacks by third parties, it may become necessary that the challenge-response process be bounded in time. While an IP address update is in progress, the MCD may be instructed to cease transmitting any packets to the network. Accordingly, an incomplete challenge-response procedure could result in the device being blocked. Upon successful validation/acknowledgment from the network, the MCD may commence sending the packets again.

Figure 7:
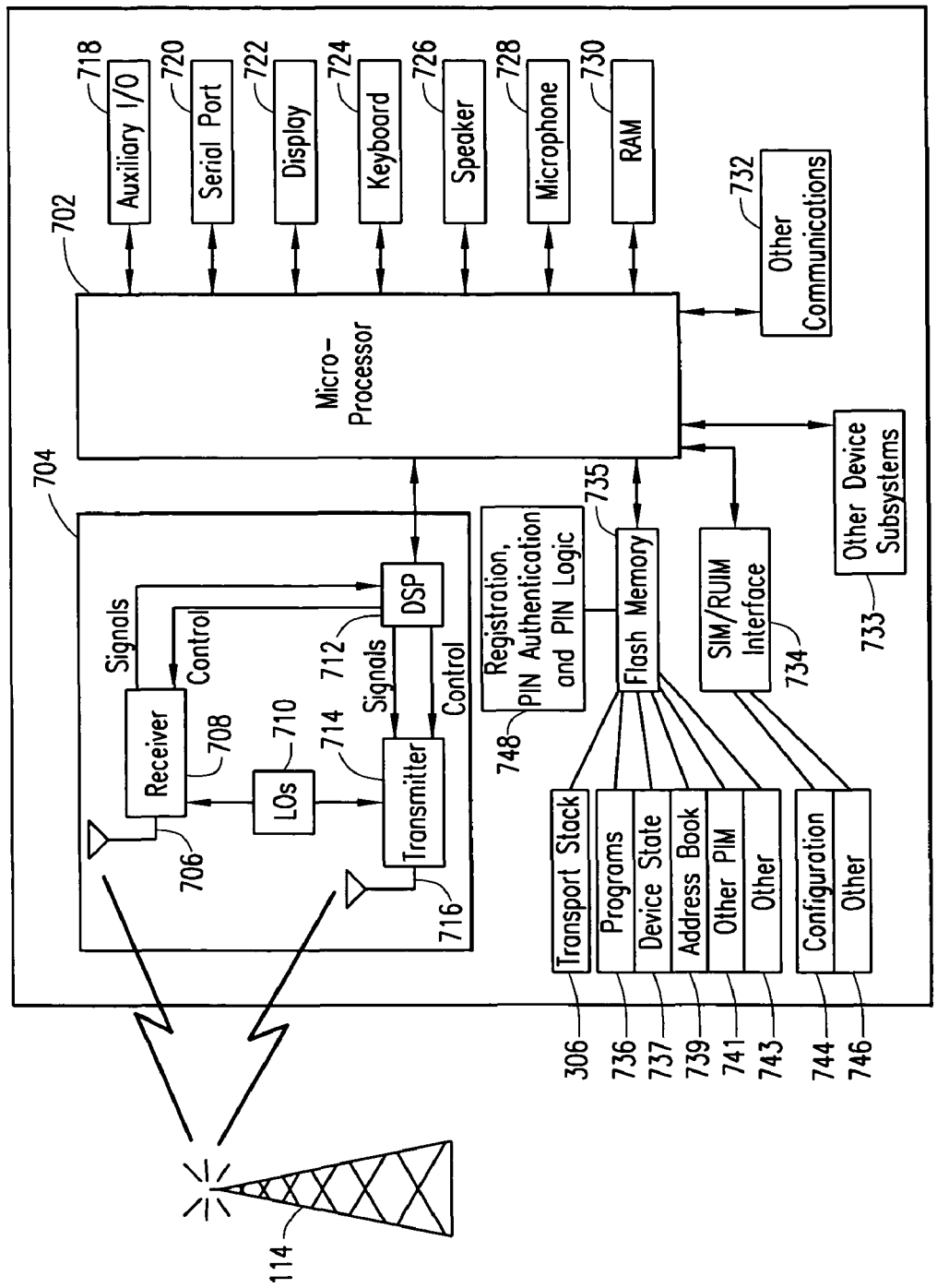
FIG. 7 depicts a block diagram of a mobile communications device according to one embodiment.

FIG. 7 depicts a block diagram of a mobile communications device operable according to one embodiment. It will be recognized by those skilled in the art upon reference hereto that although an embodiment of MCD 116 may comprise an arrangement similar to one shown in FIG. 7, there can be a number of variations and modifications, in hardware, software or firmware, with respect to the various modules depicted. Accordingly, the arrangement of FIG. 7 should be taken as illustrative rather than limiting with respect to the embodiments of the present patent application. A microprocessor 702 providing for the overall control of an embodiment of MCD 116 is operably coupled to a communication subsystem 704 which includes a receiver 708 and transmitter 714 as well as associated components such as one or more local oscillator (LO) modules 710 and a processing module such as a digital signal processor (DSP) 712. As will be apparent to those skilled in the field of communications, the particular design of the communication module 704 may be dependent upon the communications network with which the mobile device is intended to operate. In one embodiment, the communication module 704 is operable with both voice and data communications. Regardless of the particular design, however, signals received by antenna 706 through BS 114 are provided to receiver 708, which may perform such common receiver functions as signal amplification, frequency down conversion, filtering, channel selection, analog-to-digital (A/D) conversion, and the like. Similarly, signals to be transmitted are processed, including modulation and encoding, for example, by DSP 712, and provided to transmitter 714 for digital-to-analog (D/A) conversion, frequency up conversion, filtering, amplification and transmission over the air-radio interface via antenna 716.

Microprocessor 702 also interfaces with further device subsystems such as auxiliary input/output (I/O) 718, serial port 720, display 722, keyboard 724, speaker 726, microphone 728, random access memory (RAM) 730, a short-range communications subsystem 732, and any other device subsystems generally labeled as reference numeral 733. To control access, a Subscriber Identity Module (SIM) or Removable user Identity Module (RUIM) interface 734 is also provided in communication with the microprocessor 702. In one implementation, SIM/RUIM interface 734 is operable with a SIM/RUIM card having a number of key configurations 744 and other information 746 such as identification and subscriber-related data.

Operating system software and transport stack software may be embodied in a persistent storage module (i.e., non-volatile storage) such as Flash memory 735. In one implementation, Flash memory 735 may be segregated into different areas, e.g., storage area for computer programs 736 as well as data storage regions such as device state 737, address book 739, other personal information manager (PIM) data 741, and other data storage areas generally labeled as reference numeral 743. A logic module 748 is provided for storing a PIN assigned to the MCD, dynamically or otherwise, as well as for generating a PIN authentication key for transmission via registration. Also associated therewith is suitable logic for supporting one or more challenge response mechanisms, including generation of authentication values or signatures, and related cryptographic techniques and algorithms.

It is believed that the operation and construction of the embodiments of the present patent application will be apparent from the Detailed Description set forth above. While the exemplary embodiments shown and described may have been characterized as being preferred, it should be readily understood that various changes and modifications could be made therein without departing from the scope of the present invention as set forth in the following claims.

What is claimed is:

1. A mobile communications device, comprising:
   a component configured to generate an authentication key for transmitting in a registration request to a network node operable with a wireless network, said authentication key for securing a personalized indicium assigned to said mobile communications device, wherein said personalized indicium comprises a Personal Information Number (PIN) that is mapped to at least one identifier associated with said mobile communications device;
   a component configured to execute a challenge response when challenged by a challenge message from said network node, said challenge response including an authentication value of a challenge string transmitted in said challenge message, wherein said authentication value is created using said authentication key; and
   a component configured to initiate a security update with said network node upon detection of one of the mobile communications device requiring a key, the mobile communications device acquiring a new communication channel, the mobile communications device receiving a message whose decoding reveals a descrambling error, before transmitting a message the mobile communications device discovering that it doesn't have a scrambling key, the mobile communications device receiving a descrambling error, the mobile communications device receiving an improperly versioned packet, the mobile communications device receiving a packet of which it is not the intended recipient, and the expiry of a timer;
   wherein each of said components is stored on a computer-readable storage medium in said mobile communications device.

2. The mobile communications device as recited in claim 1, wherein said wireless network comprises a network selected from the group consisting of a General Packet Radio Service (GPRS) network, an Enhanced Data Rates for Global System for Mobile Communications (GSM) Evolution (EDGE) network, a 3rd Generation (3G) network, an Integrated Digital Enhanced Network (IDEN), a Code Division Multiple Access (CDMA) network and a Universal Mobile Telecommunications System (UMTS) network.

3. The mobile communications device as recited in claim 1, wherein said at least one identifier comprises at least one of an International Mobile station Equipment Identity (IMEI) parameter, an International Mobile Subscriber Identity (IMSI) parameter, an Electronic Serial Number (ESN) parameter and a Mobile Identification Number (MIN) parameter.

4. The mobile communications device as recited in claim 1, further comprising logic means for ceasing transmission of packets to said network node upon receiving said challenge message.

5. The mobile communications device as recited in claim 4, further comprising logic means for commencing transmission of packets to said network node upon receiving an acknowledgment from said network node that said PIN is legitimately bound to said mobile communications device.

6. A method for securing a personalized indicium assigned to a mobile communications device, comprising:
   detecting at a network node that said mobile communications device has requested a security update with said network node, wherein said mobile communications device's personalized indicium comprises a Personal Information Number (PIN) that is mapped to at least one identifier associated with said mobile communications device, wherein said challenge-response protocol sequence is issued by said mobile communication device based upon one of the mobile communications device requiring a key, the mobile communications device acquiring a new communication channel, the mobile communications device receiving a message whose decoding reveals a descrambling error, before transmitting a message the mobile communications device discovering that it doesn't have a scrambling key, the mobile communications device receiving a descrambling error, the mobile communications device receiving an improperly versioned packet, the mobile communications device receiving a packet of which it is not the intended recipient, and the expiry of a timer;
   responsive to said detecting, issuing a challenge message to said mobile communications device by said network node, wherein a challenge response is operable to be generated by said mobile communications device using an authentication key; and
   based on said challenge response from said mobile communications device, determining at said network node whether said PIN is legitimately bound to said mobile communications device.

7. The method for securing a personalized indicium assigned to a mobile communications device as recited in claim 6, wherein said address comprises an Internet Protocol (IP) address assigned to said mobile communications device.

8. The method for securing a personalized indicium assigned to a mobile communications device as recited in claim 6, further comprising, responsive to said detecting, performing one of dropping packets received from said mobile communications device at said network node and buffering packets received from said mobile communications device at said network node.

9. The method for securing a personalized indicium assigned to a mobile communications device as recited in claim 6, further comprising, upon receiving said challenge message from said network node, ceasing to transmit packets by said mobile communications device.

10. A method operable at a mobile communications device for securing a personalized indicium assigned to said mobile communications device, said method comprising:
   generating an authentication key for transmitting in a registration request to a network node operable with a wireless network, said authentication key for securing a personalized indicium assigned to said mobile communications device, wherein said personalized indicium comprises a Personal Information Number (PIN) that is mapped to at least one identifier associated with said mobile communications device;
   initiating a security update with said network node upon detection of one of the mobile communications device requiring a key, the mobile communications device acquiring a new communication channel, the mobile communications device receiving a message whose decoding reveals a descrambling error, before transmitting a message the mobile communications device discovering that it doesn't have a scrambling key, the mobile communications device receiving a descrambling error, the mobile communications device receiving an improperly versioned packet, the mobile communications device receiving a packet of which it is not the intended recipient, and the expiry of a timer;
   responsive to said initiating, receiving a challenge message from said network node, wherein a challenge response is generated by said mobile communications device using an authentication key.

11. The method for securing a personalized indicium assigned to a mobile communications device as recited in claim 10, wherein said authentication key is generated by a logic structure of said mobile communications device and registered with said network node via a registration request.

12. The method for securing a personalized indicium assigned to a mobile communications device as recited in claim 11, wherein said challenge message includes a randomly generated challenge string.

13. The method for securing a personalized indicium assigned to a mobile communications device as recited in claim 12, wherein said challenge response includes an authentication value of said challenge string generated by said mobile communications device with its authentication key.

14. The method for securing a personalized indicium assigned to a mobile communications device as recited in claim 13, wherein said network node is operable to determine whether said PIN is legitimately bound to said mobile communications device by verifying said authentication value in said challenge response.

15. A network system for securing a personalized indicium assigned to a mobile communications device, comprising:
   a component configured to receive at a network node a request for a security update from said mobile communications device, wherein said mobile communications device's personalized indicium comprises a Personal Information Number (PIN) that is mapped to at least one identifier associated with said mobile communications device and wherein said mobile communications device generates said challenge request message upon detection of one of the mobile communications device requiring a key, the mobile communications device acquiring a new communication channel, the mobile communications device receiving a message whose decoding reveals a descrambling error, before transmitting a message the mobile communications device discovering that it doesn't have a scrambling key, the mobile communications device receiving a descrambling error, the mobile communications device receiving an improperly versioned packet, the mobile communications device receiving a packet of which it is not the intended recipient, and the expiry timer;
   a component configured to issue a challenge message to said mobile communications device responsive to said receiving, wherein a challenge response is operable to be generated by said mobile communications device using an authentication key; and
   a component configured to determine at said network node whether said PIN is legitimately bound to said mobile communications device responsive to said challenge response from said mobile communications device;
   wherein each of said components is stored on a computer-readable storage medium in said network system.

16. The network system for securing a personalized indicium assigned to a mobile communications device as recited in claim 15, wherein said network node is operable with a wireless packet data service network comprising one of a General Packet Radio Service (GPRS) network, an Enhanced Data Rates for Global System for Mobile Communications (GSM) Evolution (EDGE) network, a 3rd Generation (3G) network, an Integrated Digital Enhanced Network (IDEN), a Code Division Multiple Access (CDMA) network and a Universal Mobile Telecommunications System (UMTS) network.

17. The network system for securing a personalized indicium assigned to a mobile communications device as recited in claim 15, wherein said PIN is mapped to at least one identifier at a database associated with said network node, said at least one identifier comprising at least one of an International Mobile station Equipment Identity (IMEI) parameter, an International Mobile Subscriber Identity (IMSI) parameter, an Electronic Serial Number (ESN) parameter and a Mobile Identification Number (MIN) parameter.

18. The network system for securing a personalized indicium assigned to a mobile communications device as recited in claim 15, wherein said authentication key is generated by a logic structure of said mobile communications device and registered with said network node via a registration request.

19. The network system for securing a personalized indicium assigned to a mobile communications device as recited in claim 15, wherein said address comprises an Internet Protocol (IP) address assigned to said mobile communications device.

* * * * *